(12) United States Patent
Leger et al.

(10) Patent No.: US 7,100,817 B2
(45) Date of Patent: Sep. 5, 2006

(54) SYSTEM AND METHOD OF FORESTRY MANAGEMENT USING RADIO FREQUENCY IDENTIFICATION TAGS

(75) Inventors: Christopher Leger, Ottawa (CA); Anthony Leger, Riverview (CA)

(73) Assignee: B. R. Close, Falls Church, VA (US)

( * ) Notice: Subject to any disclaimer, the term of this patent is extended or adjusted under 35 U.S.C. 154(b) by 0 days.

(21) Appl. No.: 10/648,702

(22) Filed: Aug. 26, 2003

(65) Prior Publication Data

US 2004/0089708 A1    May 13, 2004

Related U.S. Application Data

(60) Provisional application No. 60/408,961, filed on Sep. 9, 2002.

(51) Int. Cl.
*G06F 17/00* (2006.01)
(52) U.S. Cl. .................. 235/375; 235/376; 707/104.1; 707/7
(58) Field of Classification Search ............... 235/375, 235/376; 707/104.1, 7; 705/37
See application file for complete search history.

(56) References Cited

U.S. PATENT DOCUMENTS

| | | | |
|---|---|---|---|
| 4,373,159 A * | 2/1983 | Leavitt et al. ............... | 342/42 |
| 6,182,725 B1 | 2/2001 | Soervik | |
| 6,441,740 B1 * | 8/2002 | Brady et al. ............. | 340/572.7 |
| 6,669,089 B1 * | 12/2003 | Cybulski et al. ............. | 235/385 |
| 6,671,698 B1 * | 12/2003 | Pickett et al. ............. | 707/104.1 |
| 2001/0004237 A1 * | 6/2001 | Lake et al. ............... | 340/573.1 |
| 2002/0084889 A1 * | 7/2002 | Bolavage et al. .......... | 340/10.1 |
| 2003/0038172 A1 * | 2/2003 | Bodin et al. ................ | 235/100 |
| 2003/0089771 A1 * | 5/2003 | Cybulski et al. ............ | 235/385 |
| 2003/0218060 A1 * | 11/2003 | Carlson ...................... | 235/376 |

FOREIGN PATENT DOCUMENTS

| | | |
|---|---|---|
| DE | 199 12 806 | 9/2000 |
| EP | 0 248 928 | 12/1987 |
| EP | 1 246 152 | 10/2002 |
| FR | 2 763 164 | 11/1998 |
| FR | 2 797 975 | 3/2001 |
| WO | WO 01/97597 | 12/2001 |

OTHER PUBLICATIONS

Internet article, "RFID" from University of Washington Precision Forestry Cooperative available at http://www.cfr.washington.edu/research.pfc/research/index.html and dated May 9, 2002.*
"RFID" Internet article by the Precision Forestry Cooperative dated Mar. 28, 2001, at url http://www.cfr.washington.edu/research.pfc/research/index.htm and captured by the Internet Archive (http://www.archive.org) o May 17, 2001.*

* cited by examiner

*Primary Examiner*—Jared J. Fureman
*Assistant Examiner*—Daniel A. Hess
(74) *Attorney, Agent, or Firm*—Tighe Patton

(57) ABSTRACT

A system and method of forestry management using frequency identification tags. In one aspect, the present invention involves a forestry management process that comprises inserting at least one tag that has a frequency capable of being read by a scanner into a tree, then scanning the tag. The frequency of the inserted tag(s) will have a frequency that is identifiable over other frequencies. Information is associated with the tag before after or during the insertion. After insertion, a subsequent scan is performed on the tag and some or all of the associated information is obtained. The information obtained is then used in one or more aspects of forestry management.

17 Claims, 3 Drawing Sheets

SYSTEM AND METHOD OF FORESTRY MANAGEMENT USING RADIO FREQUENCY IDENTIFICATION TAGS

This patent application claims priority to U.S. provisional application No. 60/408,961, Digital Forestry ID Process, filed Sep. 9th, 2002.

BACKGROUND

Properly identifying trees is a critical part of forestry management. Aspects of proper identification begin with the need to harvest certain trees over others, but also extend into the proper markings of ownership and as well as border delineation.

When managing the harvest of a forest, it is often important to keep track of trees in a group and even on an individual basis. Current methods for marking trees employ external identifiers, such as metal labels, plastic ribbons, flags or paint. All of these methods rely on direct line of sight with the identifier, and all may be damaged or removed by the elements, animals, counterfeiters, vandals or thieves. When it is considered that proper management of a copse or of individual tree spans years or decades, the inadequacies of current identifiers becomes even more apparent.

Visual markings also increase the likelihood of user error. For example, a tree marked five years ago might be misinterpreted by new personal surveying the tree. The visual markers rely on the knowledge and/or memory of the person observing the mark For these reasons, proper management and protection of trees has been limited by the use of inadequate identifiers. Further, although trees also make a tempting border marker, the ability to properly mark a border is also limited by the failures of using external border markers discussed above.

What is needed is an identifier that is resistant to wear, does not rely on line of sight, is difficult to tamper with or counterfeit, and is user friendly.

SUMMARY OF THE INVENTION

The present invention relates to systems and methods of tagging trees by inserting into the body of a tree a frequency identification tag. The tag may have a unique identifier, or be one of a batch of similar tags. Tags that are inserted into trees may be scanned and associated with specific information concerning the owner, the tree, the area or other aspects of forestry, land and environmental management.

The tags may be writeable, meaning that their identification may be in some way altered by the scanning process, or read-only. Writeable tags may have their information altered before, during or after insertion into a tree. The tags, whether writeable or read-only, may likewise be associated with a specific date or other information before, during or after insertion.

Tags may be active, in that they contain their own power source, or passive. Two or more tags may be inserted into a tree, and may be inserted in different locations on the same tree. The frequencies used by the tags may be of any practical frequency, but include radio and microwave. Casings for the tags maybe made of a variety of materials, but are, for example, plastic or glass.

Scanners may be hand-held, or mounted in some manner. Scanner may also be linked to a computer database or network. Computer networks include the atomization of aspects of the forestry industry, which are made possible or improved upon by the present invention.

DETAILED DESCRIPTION OF THE INVENTION

The present invention involves inserting into a tree a frequency tag that is capable of being scanned by an appropriate scanning device. The inserted tag is then scanned and information gained from the scan is used in the forestry management industry. Tagging by the present invention not only improves upon the current methods of tagging, but opens new applications and uses for tags.

As hereinafter described, forestry management refers to forestry, land, environmental and other related industries in which the present invention is applied.

Figure 1:
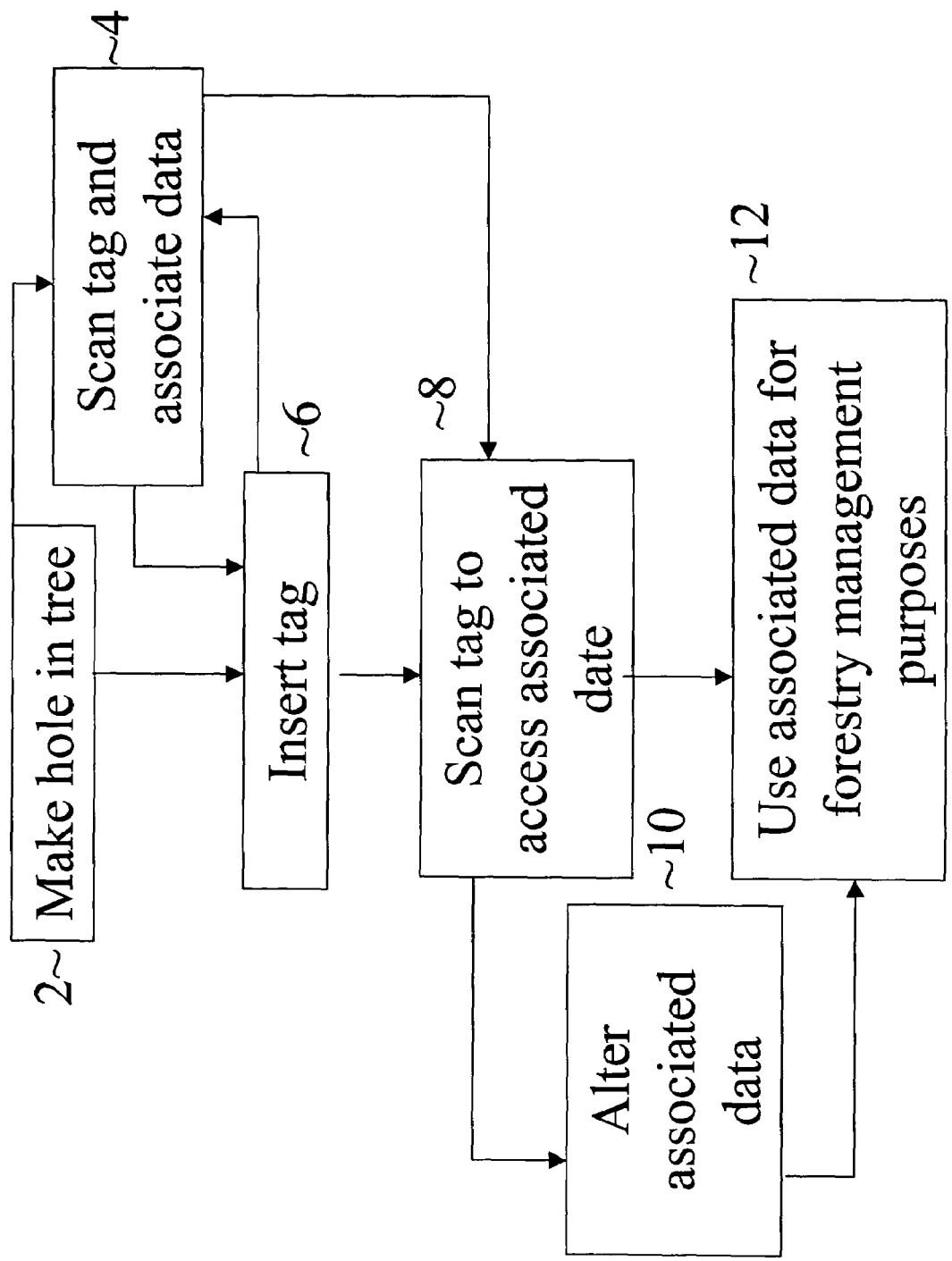
FIG. 1 show a box diagram according to one aspect of the present invention.

FIG. 1 illustrates one embodiment of the present invention. A hole is made in a tree 2, has a tag inserted into it 6 which is either scanned before or after insertion 4 to have data associated with the particular tag. The hole may be drilled, punched or even formed naturally. It is preferable to seal any holes made in a tree afterwards with a tree friendly sealant. The tag may be scanned prior to insertion, after, during or any of the three combined. Data may be associated with the tag prior to this time, at this point, or any time thereafter. In one embodiment the tags have pre-associated data and do not strictly need to be scanned to have data associated, but are preferably scanned after insertion to verify functionality.

An inserted tag that has associated data will subsequently be scanned to access at least some portion of the associated data 8. This may be done a number of times. The associated data may be changed at this point 10, or at any point convenient to a user. Associated data may be stored on the tag itself, but may be, for example, contained in a separate data base. The database may be part of the scanner system, or may be a separate system entirely. The accessed associated information is then used for some aspect of forestry management, such as identifying the tree, the area, the status of the tree or area, or the status of nearby wildlife, borders, harvest times, re-planting times or any other information used in the industry. When modifying the associated information, the modification may be to information on the tag, in a separate database, or in combinations thereof.

As discussed above, the tagging of a tree according to the present invention involves insertion of a frequency tag into the body of a tree. By insertion, it is preferred that the majority to the totality of the tag is within the tree itself. When desired, an antenna of the tag may protrude from the tree, but this is not necessary for the invention. By being inside of a tree, the tag is protected from the elements and wildlife as well as vandalism, theft and counterfeiting. The life of an imbedded tag can therefore last for multiple scores of years. When guarding against tampering, the visible mark left on the tree may be made minimal to unnoticeable. In accordance with one embodiment, the tags are placed such that the tree grows around them. This reduces the initial impact to the tree, since a smaller hole or slit is used to affix the tags.

In an alternate embodiment the tag may be affixed to the outside of the tree. This may be desirable in certain situations, such as if the tag placement is temporary or if a hole is not able to be made at the time of tagging. Similarly, the tag may be placed in proximity to the tree, such as in the ground. This is a particular embodiment that may optionally by done when the trees are small. As discussed, additional tags can then later be inserted once the trees have grown to sufficient size. As used herein, the term attaching refers to all possible techniques of inserting or affixing tags in, on, or near a tree.

To further inhibit tampering of the tag, the types of tag and scanner systems used may have their precision dulled, so that scanning of the tree will identify the tag, but will not pinpoint the exact location of the tag inside the tree. Tags can be inserted into the most valuable area of a tree, thereby protecting most of the tree from theft, since a thief would have to remove too large a section to make the theft profitable.

If a tree that has a tag is stolen, scanners located at likely areas of travel can be positioned to catch the thief. Such areas include but are not limited to access road junctions, truck inspection stations, border crossings, and lumberyards. Portable scanners may also be provided to enforcement agencies who may track and halt the thieves. This further has the benefit of catching thieves in a controlled environment, rather than needing to catch them in the act at remote locations.

Although the present invention improves upon the security of lumber resources, it may further be improved by means such as coding scanners or tags so that pass codes are needed to use either. Also, "false" tags may be inserted into the tree to confuse thieves about the presence of the "real" tags. These are just examples of the many extra precautions that may be taken due to the flexibility of the system.

The tag itself may have a casing which protects both the tag and the tree. Casings that are tree friendly preferably do not significantly interfere with the scanning of the tags. Types of casings include glass and plastics. Antennas may extend from the casing to improving scanning, and may even extend out of the tree itself. Alternately, part of the casing might also extend out of the tree to provide a visual marking or aid in the scanning, or to improve scanning properties.

The location of a tag inside of a tree is also a consideration. If a tree is to be harvested for wood, then it is preferable to insert the tag in the trunk of the tree so that it survives the cutting and initial transportation. If the tag is placed near the bark of the tree, it will be removed during the processing of the wood and not damage the more valuable center. If a tag is placed toward the center of the tree, or in a position that becomes the center, then the tag is preferably constructed of materials and on a size that will not interfere with lumber processing. These are preferred embodiments, for example, when the tag(s) is being used to fight wood theft or in the harvesting process. Tags used in border markings or academic tree identification may have less stringent placement requirements.

The frequency of the tag may be of any type useable in the art, but is, for example, radio or microwave. The tags may be active, in that they contain their own power source, or passive. Low frequency tags are useful for reading through materials but are read at shorter distances than high frequencies, but high frequencies tend to require a more direct line of site. The tags may also be read only, so that the tag information cannot be changed by scanning, though associated information on a separated database may still be change if desired. If the tags are writeable, the writeablility may be limited to a certain context. For example, the date of the last scan may be changed, along with the health of the tree, but the type of tree and position of the tree may be restricted to read only.

In a particular embodiment, some information is updated automatically by scanning, while other information may be updated manually. The automatic updating may be controlled remotely. For example, it may be predetermined that scanning of a particular species of trees automatically marks them for harvest.

The scanners in accordance with one embodiment are specialized to the tags themselves. For example, the tags can only be read by certain scanners and vice versa. In an alternate embodiment, different scanners may obtain different levels of information from the same tag. Similarly, in one embodiment the frequencies used are kept proprietary, so that unauthorized persons will have difficulty in obtaining a proper scanner to read the tags.

When the tags are scanned, in accordance with one embodiment the information is transferred directly into a computer database that uses the information in related program applications. The programs usable in this embodiment are quite varied. For example, trees tagged for border marking are instantly produce a map of the border when scanned. Trees tagged for harvest are give information on harvest dates, tree health or produce a map of similar trees in the area. The program prompts for an update on the tree, such as estimated time till harvest, current condition, or associated wild-life in the area. The scanners themselves have specialized programs that perform desired functions.

Figure 2:
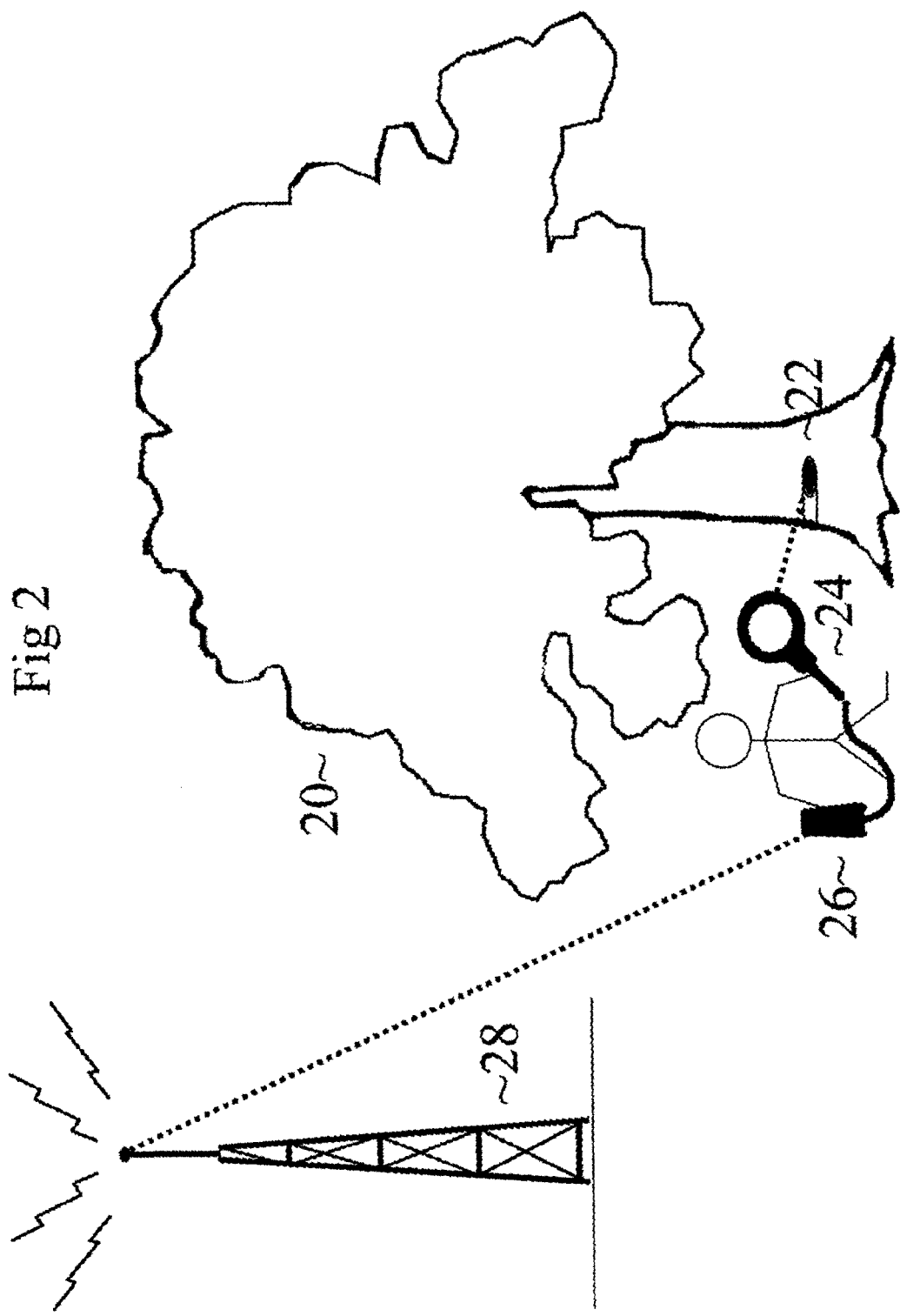
FIG. 2 shows the scanning of a tag imbedded inside of a tree according to one aspect of the present invention.

Scanned information may be collected manually, stored in the scanner or transferred to a linked device. The scanner may be linked to an accompanying device directly or may be linked to a remote database(s) using a communications network, such as a radio or cellular tower. FIG. 2 shows the scanning of a tag 22 imbedded inside of a tree 20. Upon scanning, a scanner 24, which in this case is a hand-held unit, reads the tag and is either by physically 26 or remotely 28 linked to a database. In some instances the database and the scanner may be in a single unit. Some applications may store the scanned information for latter association with a database. FIG. 2 shows one example of a hand-held scanner, however, scanners may also be mounted on vehicles, such as motorcycles, four wheelers, jeeps, airplanes and helicopters. In this figure, one embodiment of how the tag is inserted into the tree is shown. In alternate embodiments, the tag is inserted at different depths and in different orientations.

Figure 3:
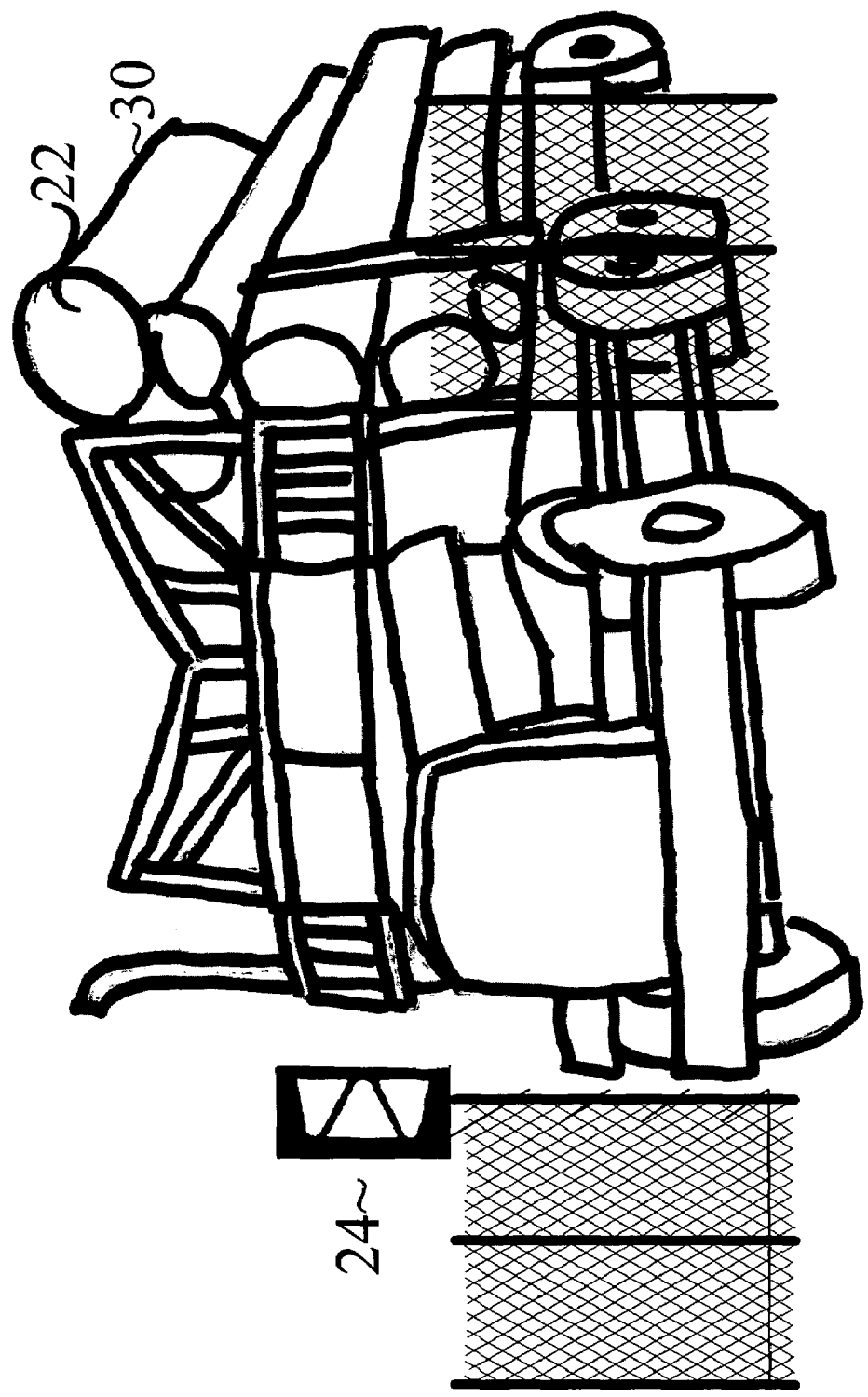
FIG. 3 shows a cut tree being scanned at a fixed location according to one aspect of the present invention.

FIG. 3 shows a different use, when a cut tree 30 with an imbedded tag (not shown) is being driven past a check point a mounted scanner 24 relays the scanned information 31 to a database and/or user. It should be noted that antenna may be mounted on any conceivable object, such as gates, poles, trees or buildings, or even be a hand-held unit carried by a worker.

Associated data may be data on the tree, area or forest itself, or simple code used to translate scanned data into a useable form.

The scanner system may be linked with other systems, such as a global positioning satellite.

Various types of tags currently in use in other arts may be used with the present invention. These include but are not limited to the Texas Instruments® 23 mm, 32 mm and 50 mm glass transponders, referred to as products RI-TRP-RR2B, -WR2B, -DR2B, -IR2B, -RRHP, -WRHP, -BRHP and -W9TB. Scanners and antennas are of the 2000 series. Another provider is Biomark®, which produces 20 mm and 23 mm pit tags, referred to as products TX1410BE and TX1415BE. Scanners are the FS2001F-ISO reader kit with racket antenna, or the FS2001-ISO triangle antenna may also be used.

In one aspect, the present invention involves a forestry management process that comprises inserting at least one tag that has a frequency capable of being read by a scanner into a tree, and scanning the tag before, during or after insertion or combinations thereof. The frequency of the inserted tag(s) will have a frequency that is identifiable over other frequencies. Information is associated with the tag before after or during the insertion, or combinations thereof. After insertion, a subsequent scan is performed on the tag and some or all of the associated information is obtained. The information obtained is then used in one or more aspects of forestry management.

Preferably, the insertion of the tag(s) would have a negligible effect on the tree. Also, the insertion of the tag would preferably leave a minimal visual mark on the tree. The tag may be inserted into any portion of the tree, including the trunk and the base. If multiple tags are inserted, in some aspects of the present invention at least two of the tags are placed in different locations. These two locations may include the portion of the tree that is harvested and the stump that remains at the harvest sight.

When the subsequent scan of the inserted tag(s) is performed, the associated information may be changed or added to. The associated information can be of any conceivable information related to the forestry industry, including a tree identifier, harvest date, border marking, owner marking, environmental assessment and area identifier. A scanner may be a lone unit, or part of a multiple scanner system.

The frequencies used by the present invention can be of any viable frequency, but include radio and microwave. The tags themselves may be active, in that they have their own power source, or passive.

Scanners innately include an antenna portion. The antenna portion of the scanner, or the whole scanner itself, may be mounted on a vehicle, or at a fixed point, such as a yard entrance or inspection point. The scanner may be a hand held, independent unit or units, or linked to a database, such as a computer. The computer itself may be an independent unit, or linked to a computer system. The computer may also be linked to another scanning system. For example, a user may have a hand-held scanner that is not directly linked or a part of a database. After scanning an inserted tag, the user then access a computer that is linked to a scanner at a lumber yard. The user may then be able to determine if a related tag has been scanned by the other scanning system. In the case of scanning a tree stump, the user can then find out if associated trunk has passed the scanning system, such as an inspection station. Another example would be a user scanning a tree, then accessing a computer linked to a scanning system at a lumber mill to determine the quantity of similar tree processed at the lumber mill to help determine if the scanned tree should be harvested.

The present invention will improve upon the automation of forestry management, as well as the more specific area of lumber processing. Once information has been associated with a tag, later users do not need to re-identify the specific tree manually. A simple scanning will inform subsequent users about all associated data. For example, a tree may be marked to be left uncut for five years. Three years later, people unaware of the decision to not cut the tree may simply scan the imbedded tag to find out the associated instructions. Further, a tree may be not only tagged for cutting, but also for a particular type of lumber processing. Cutters may approach the tree and scan it to be told that it needs to be cut. Routers may then scan the tree to determine where to send it. Lumber processors may then scan tree to determine how to cut/process it. Many of these process may even be done by automation, such as a crane that lifts a log, and the imbedded tag tells the crane where to move it, and later how it should be processed.

Wood certification is another aspect of forestry management that may be improved by the present invention. Once a database has been created, a buyer or inspector need only scan an imbedded tag to confirm that they have the appropriate tree. This reduces the need for expertise or first hand knowledge in order to verify or certify a tree.

Since tags are inserted into the trees themselves, there is minimal or no impact on the environment in using the present invention. Further, the present invention provides for the more effective use, as well as conservation, of energy resources. Wood can be tracked from the time a tree is implanted until that same tree is sold. It would allow for more accurate records to be kept of a forest's history (stand type, tree measurements, silvicultural methods, past harvests, fires, insect infestation, etc.). That forest could be then broken down into individual stands, and even further into individual trees. Very accurate growth and yield curves could be easily generated and updated for any stand. This would allow a forest manager to harvest stands at their highest yield and with the most efficient harvest system for that particular stand (select cut, clear cut, shelterwood cut, etc.). By doing this the most potential is realized with each stand, and with less error that causes waste and with the minimal amount of environmental impact.

With the present invention, trends can be tracked over time. This will allow better cost effective analysis, for example, more precise planning on when to cut and when to harvest.

Though the present invention greatly improves upon prior art methods of tree tagging, it may also be used in conjunction with these other methods.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the inventions which, is to be given the full breadth of the claims appended and any and all equivalents thereof.

What is claimed is:

1. A forestry management process comprising:
    inserting, at least a first tag having a frequency capable of being read by a scanner into a trunk portion of a tree;
    associating at least one item of information with said first tag;
    performing at least one subsequent scan on said first tag, wherein said subsequent scan takes place after said first tag is inserted into said tree;
    obtaining said at least one item of information associated with said first tag;
    wherein said at least one item of information is relevant to forestry management;
    wherein at least a second tag is inserted in the base portion of said tree, and wherein said second tag in the base portion of said tree matches said first tag, whereby matching includes at least one piece of common information;

harvesting said trunk portion of said tree, wherein said second tag in the base portion of said tree remains unharvested.

2. The forestry management process as in claim 1, wherein the inserting of said first tag leaves an immediate minimal visual mark on said tree.

3. The forestry management process as in claim 1, wherein said at least one item of information is changed after performing said subsequent scan.

4. The forestry management process as in claim 1, wherein said at least one item of information comprises at least one of a tree identifier, a border marking, an owner marking, an environmental assessment an area identifier, and a harvest date.

5. The forestry management process as in claim 1, wherein said at least one item of information is related to data in a remote data base.

6. The forestry management process as in claim 5, wherein said data in said remote data base comprises instructions on when to harvest said tree.

7. The forestry management process as in claim 1, further comprising sending said at least one item of information associated with, said first tag to a computer.

8. The forestry management process as in claim 7, wherein said computer gives instruction when to harvest said tree.

9. The forestry management process as in claim 7, wherein said computer system is linked with a computer.

10. The forestry management process as in claim 7, wherein said computer is linked with a scanning system.

11. The forestry management process as in claim 1, wherein said subsequent scan is performed with a scanner mounted on at least one of a lumber yard entrance, a lumber yard building, and a truck inspection station.

12. The forestry management process as in claim 1, wherein said frequency is a radio frequency.

13. The forestry management process as in claim 1, wherein at least one of said first tag and said second tag is passive.

14. The forestry management process as in claim 1, wherein at least one of said first tag and said second tag is active.

15. A forestry management process comprising:
inserting, at least first tag having a frequency capable of being read by a scanner into a tree;
scanning said first tag by a person;
associating at least one item of information with said first tag;
performing at least one subsequent scan on said first tag;
obtaining said at least one item of information associated with said first tag;
inserting a second tag into a tree;
wherein said frequency is identifiable over other frequencies;
wherein said at least one item of information is relevant to forestry management;
wherein said at least one item of information is related to data in a remote data base;
wherein information associated with said first tag includes a harvest identifier; and
harvesting said tree, wherein at least one tag remains in said tree at least until said tree arrives at a processing center;
wherein at least one tag is in the base portion of the tree
wherein at least one tag is not harvested with said tree, and wherein the tag not harvested matches at least one piece of information associated with the harvested tag.

16. The forestry management process as in claim 15, wherein said person may alter said associated data.

17. A forestry management process comprising:
inserting at least a first tag having a frequency capable of being read by a scanner into a harvesting portion of a tree and wherein said frequency is pre-associated with at least one item of information relating to forestry management;
scanning said first tag;
obtaining said at least one item of information associated with said at least one tag;
wherein said at least one item of information is related to forestry management; and
inserting at least a second tag into a stump portion of said, tree, where said stump portion is a non-harvested portion of said tree;
wherein said second tag matches said first tag;
wherein said first tag is associated with information concerning the location of said second tag.

* * * * *